Patented Mar. 25, 1952

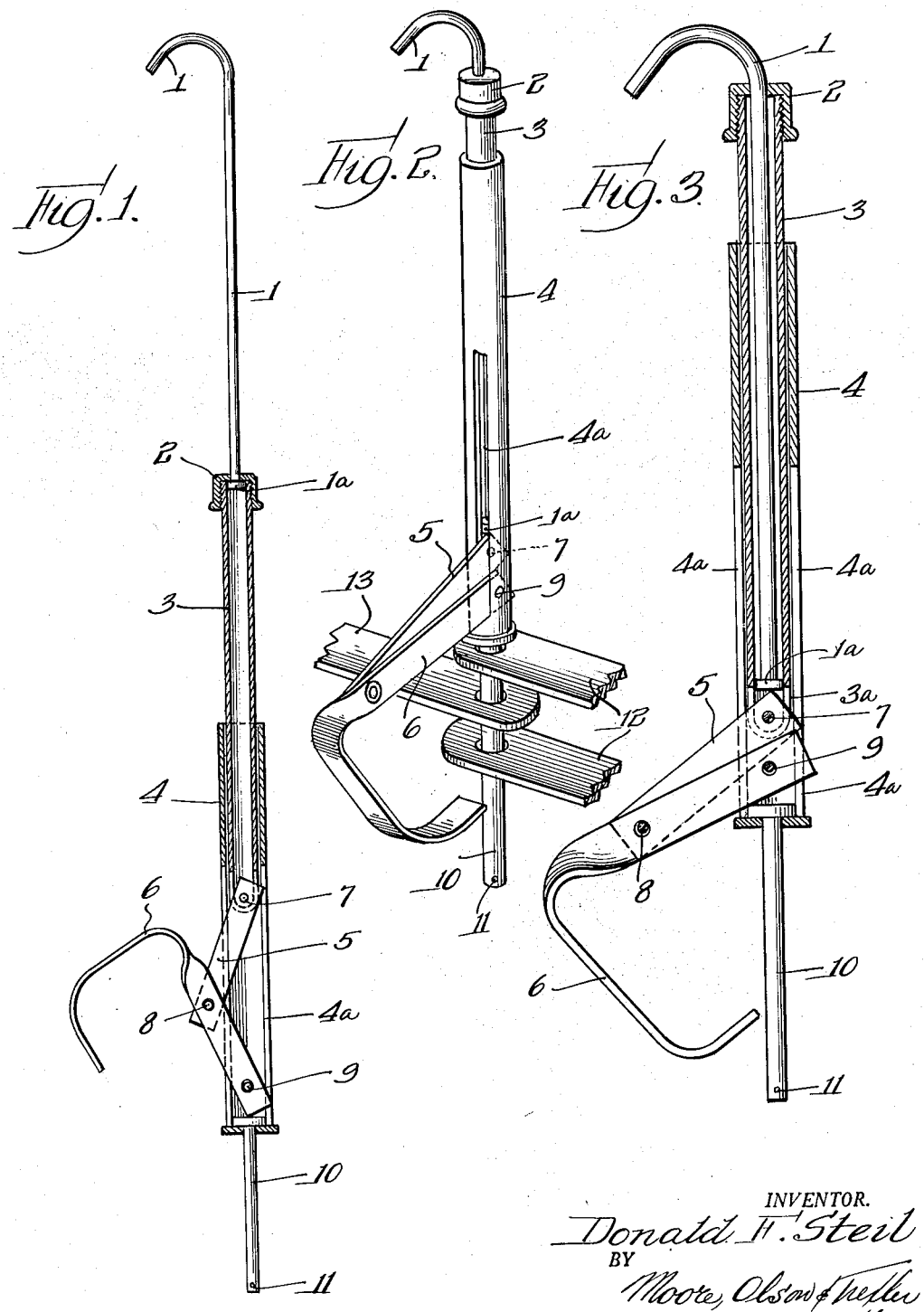

2,590,218

UNITED STATES PATENT OFFICE 2,590,218

TRACTOR HITCH

Donald F. Steil, Dodgeville, Wis.

Application January 27, 1949, Serial No. 73,031

5 Claims. (Cl. 280—33.15)

This invention relates to hitches for joining powered vehicles to unpowered vehicles so that the former may pull the latter and relates more particularly to a hitch for connecting a prime mover such as a tractor to a farm implement to be drawn thereby.

In connecting powered vehicles to unpowered vehicles for purposes of moving the latter, it is generally necessary to line up one or more holes at the extremity of the hitch coupling of the unpowered mobile unit with one or more holes in the hitch coupling of the powered vehicle. It is then necessary to insert a pin through the aligned holes and to secure the pin in the holes by some means such as a cotter pin or key inserted through the free end of the pin.

In order to accomplish the hitch just described it has heretofore been necessary to back the powered vehicle to a point sufficiently accurate in relation to the tongue hitch to enable the operator of the powered vehicle, after dismounting, to manually align the holes in the hitch couplings of the two vehicles and insert the pin. If the vehicles had not been relatively positioned with extreme care, it has often been necessary for the operator to remount the powered vehicle and re-position it before the aligning could be completed. This has been a very tedious process and in the case of a tractor and farm implement it has required the operator to alight in most unfavorable weather conditions in snow or mud or the like.

It is therefore an object of the present invention to present a tractor hitch whereby a tractor may be coupled to an unpowered farm implement without the operator's descending from the tractor.

Another object of this invention is to present a tractor hitch which makes exact relative positioning of the tractor and unpowered farm implement unnecessary before starting to align the holes in the hitch coupling.

A still further object of the present invention is to present a tractor hitch which does not require the insertion of a cotter key or pin or some like holding member in a pin joining the hitch coupling of the powered and unpowered units.

Other and further objects and advantages of the present invention will be apparent to those skilled in the art upon a perusal of the following description when taken in conjunction with the accompanying drawings in which:

Figure 1 is a side elevation partly in section of the tractor hitch in extended position;

Figure 2 is a perspective view of the tractor hitch in operative position joining the hitch couplings of the powered and unpowered units;

Figure 3 is a side elevation partly in section of the tractor hitch in collapsed operative position.

A hook-shaped rod 1 is slidably fitted within a cap 2 and prevented from becoming disengaged from said cap by a button-like portion 1a constituting the lower end of the rod 1. The cap is internally threaded and screws onto external threads at the top of a hollow cylindrical member 3. The member 3 fits within a slightly larger cylindrical member 4. The fit is such that the two members may be manually moved axially but will not so move without the application of an external tensile force. The member 3 is provided with a longitudinal slot 3a at the bottom for receiving the bar 5. The bar 5 is drilled slightly off center adjacent one end, a rivet 7 passes through this hole and cooperates with transverse holes in the lower portion of the member 3 to secure the bar 5 within the slot 3a. A metal strap is twisted and bent into the shape of a hook 6, the extending end of which fits within a longitudinal slot 4a at the lower end of the member 4. The hook 6 is pivotally secured to the bar 5 by a rivet 8 and to the member 4 by a rivet 9. The holes in the hook 6 for receiving the rivets 8 and 9 are of greater diameter than are the rivets so that a snap action is imparted to the hook when the hitch is closed. A steel bolt 10 having a transverse hole 11 near its lower extremity is secured within the member 4 adjacent the lower end thereof by any suitable means such as welding or a force fit within an end portion suitably secured to the lower extremity of the member 4. In operation the bolt 10 fits through holes in the hitch coupling 12 of the unpowered farm implement and in the hitch coupling or draw bar 13 of the tractor or other powered vehicle as shown in Figure 2.

The tractor hitch is normally carried in closed or collapsed position as shown in Figure 3 with the bolt 10 fitted through the hole in the draw bar 13 of the tractor. To hitch the tractor to a farm implement the operator first backs the tractor to within about two feet of the implement. Without dismounting from the tractor he then reaches down and grasps the member 3 at its top and lifts upward. This causes the member 3 to slide upward within the member 4 and raises the hook 6 by means of the bar 5 to the open position seen in Figure 1. Continued upward movement of the member 3 withdraws the pin from the hole in the draw bar 13. The tractor hitch is then inverted and the hook-shaped rod 1 slides to an extended position of its own weight. It is of course to be understood that the operator could have pulled upward on the rod 1 to extend the hitch rather than to have pulled up on the member 3. The tractor hitch is now held by the bolt 10 and the hook-shaped rod 1 is used to hook the hitch coupling 12 of the unpowered unit whereby the coupling 12 may be lifted up to juxtaposition with the draw bar 13. If the tractor was not exactly aligned in the first place, it is now easy to move it forward or backward so that the holes in the hitch coupling and draw bar may be aligned. The operator then returns the tractor hitch to its upright position and positions the bolt 10 within the aligned holes. The hook-shaped rod 1 will slide into the member 3 and a push downward on top of the tractor hitch by the operator will force the member 3 to telescope within the member 4 and place the hook 6 in the closed position shown in Figures 2 and 3. The oversized holes of the hook 6 which receive the rivets 8 and 9 impart a snap-locking action to the hook 6 which then prevents the bolt from being thrown out of the hitch coupling in case the tractor hits a bump while moving at a rapid rate. It is virtually impossible for the hook 6 to be thrown open even at high speeds as the weight of the member 3 coupled with the weight of the rod 1 on the end of the bar 5 combined with the off-center hole in the bar 5 receiving the rivet 7 cooperate to lock the hook in closed position. Still further locking action is brought about by friction between the bar 5 and the hook 6 caused by their fitting rather tightly together in closed position as best seen in Figure 2. Although the hook 6 is sufficient to retain the tractor hitch in position in the hitch couplings, it is sometimes necessary to present other securing means when traveling on highways in order to comply with state law. To meet this requirement a cotter pin or the like is placed in the hole 11.

It is apparent that a tractor hitch has been herein presented which allows the operator to hitch a farm implement to a tractor without dismounting from the tractor and that furthermore precise relative positioning of the implement and tractor is not necessary at the start of the hitching operation. Although a particular embodiment of the present invention has been shown and described with reference to a tractor and an unpowered farm implement, it is apparent that it may be used either in the illustrative or a modified form with other powered vehicles and unpowered mobile units. The invention is therefore to be limited only by the scope of the appended claims.

I claim:

1. A hitch mechanism for hitching an unpowered mobile unit to a powered vehicle, said mechanism comprising extensible means having a hook at one end whereby the hitch couplings of said unpowered unit and said powered vehicle may be juxtaposed from the operating position of said powered vehicle, means mounted substantially at the other end of said extensible means for securing said hitch couplings adjacent to each other and locking means mounted substantially at said other end for locking said securing means in place and operable from said one end of said extensible means.

2. A hitch mechanism for hitching an unpowered mobile unit to a powered vehicle, said mechanism comprising a plurality of telescoping members whereby said mechanism may be extended, means substantially at one end of said telescoping members to move the hitch coupling of said unpowered unit from a remote location to a location adjacent the hitch coupling of said powered vehicle, means substantially at the other end of said telescoping members for securing said hitch couplings adjacent each other, and locking means substantially at the same end of said telescoping members as said securing means for locking said securing means in place and operable from the opposite end of said telescoping members.

3. A hitch mechanism as defined in claim 2 in which one of said telescoping members fits loosely within another for ready extensibility and two of said members fit tightly together for providing greater rigidity and for frictionally locking said securing means.

4. A hitch mechanism for hitching an unpowered mobile unit to a powered vehicle, said mechanism comprising a plurality of extensible members including a substantially hook-shaped member whereby the hitch coupling of said unpowered unit may be moved from a remote position to a position adjacent the hitch coupling of said powered vehicle, a pin substantially at one end of said extensible members for securing said hitch couplings in adjacent relationship, a locking member pivotally mounted adjacent said pin for securing said pin in securing position, and a member pivotally mounted on one of said extensible members and on said locking member to pivot said member to and from locking position in response to relative collapse and extension of said extensible members.

5. A hitch mechanism for hitching an unpowered mobile unit to a powered vehicle, said mechanism including a pin adapted to extend through the hitch couplings of said unpowered mobile unit and said powered vehicle, a radially enlarged portion at the upper end of said pin for limiting the position of said pin in said hitch couplings, a cylindrical member extending coaxially from the upper end of said pin, at least one other cylindrical member arranged coaxially and telescopically with said first named cylindrical member, and a hook on the upper end of said last named cylindrical member for bringing said hitch couplings into juxtaposition.

DONALD F. STEIL.

REFERENCES CITED

The following references are of record in the file of this patent:

UNITED STATES PATENTS

| Number | Name | Date |
|---|---|---|
| 1,783,189 | Green | Dec. 2, 1930 |
| 2,072,391 | Varney | Mar. 2, 1937 |
| 2,454,856 | Bible | Nov. 30, 1948 |
| 2,483,111 | Spillman | Sept. 27, 1949 |